United States Patent
Ney et al.

(10) Patent No.: US 11,934,224 B2
(45) Date of Patent: Mar. 19, 2024

(54) STATIC STRUCTURE HAVING A PLURALITY OF DETACHABLE COMPONENTS

(71) Applicant: Definitive Technology Group, LLC, Wilmington, MA (US)

(72) Inventors: Patrick Ney, Wakefield, MA (US); Stephen Shaheen, Wakefield, MA (US)

(73) Assignee: Definitive Technology Group, LLC, Wilmington, MA (US)

( * ) Notice: Subject to any disclaimer, the term of this patent is extended or adjusted under 35 U.S.C. 154(b) by 673 days.

(21) Appl. No.: 16/972,993

(22) PCT Filed: Jun. 6, 2019

(86) PCT No.: PCT/US2019/035887
§ 371 (c)(1),
(2) Date: Dec. 7, 2020

(87) PCT Pub. No.: WO2019/236920
PCT Pub. Date: Dec. 12, 2019

(65) Prior Publication Data
US 2021/0247807 A1 Aug. 12, 2021

Related U.S. Application Data

(60) Provisional application No. 62/681,586, filed on Jun. 6, 2018.

(51) Int. Cl.
*G06F 1/16* (2006.01)
*H02J 7/00* (2006.01)

(52) U.S. Cl.
CPC ........ *G06F 1/1632* (2013.01); *H02J 7/00034* (2020.01); *H02J 7/0044* (2013.01); *H02J 7/0045* (2013.01)

(58) Field of Classification Search
CPC .................................................... G06F 1/1632
See application file for complete search history.

(56) References Cited

U.S. PATENT DOCUMENTS 9,429,992 B1 8/2016 Ashenbrenner et al.
9,705,359 B2 7/2017 Boyd
(Continued)

FOREIGN PATENT DOCUMENTS

WO 2008060952 A2 5/2008

OTHER PUBLICATIONS

International Searching Authority, International Search Report, PCT/US2019/035887, dated Sep. 17, 2019.
(Continued)

*Primary Examiner* — Anthony Q Edwards
(74) *Attorney, Agent, or Firm* — Reichel Stohry Dean LLP; Mark C. Reichel; Natalie J. Dean

(57) ABSTRACT

Static base station structures having a plurality of detachable mobile components, systems, and methods of receiving, storing, and charging the plurality of detachable mobile components are disclosed herein. The static base station structure may be a desk or kiosk including an electronic device. The plurality of detachable mobile components may be wheeled mobile desks or kiosks, each having their own electronic device, and detachable from and independently operable from the static structure. The electronic devices of the plurality of detachable mobile components may maintain wireless communications with the electronic device of the static structure, or with the electronic device of another remote device, even when physically separated. When the detachable mobile component is no longer needed, it may be returned to a docking station within the static base station structure for storing and charging.

19 Claims, 4 Drawing Sheets

(56) References Cited

U.S. PATENT DOCUMENTS

| | | | |
|---|---|---|---|
| 2004/0165348 A1 | 8/2004 | Clark et al. | |
| 2007/0022921 A1* | 2/2007 | Perkins | B25H 3/00 |
| | | | 108/64 |
| 2009/0174363 A1 | 7/2009 | Maher | |
| 2010/0011997 A1* | 1/2010 | Hancock | G06F 1/1632 |
| | | | 108/50.02 |
| 2010/0228405 A1 | 9/2010 | Morgal et al. | |
| 2011/0193524 A1* | 8/2011 | Hazzard | H02J 7/0013 |
| | | | 320/114 |
| 2015/0208826 A1* | 7/2015 | Yang | F16M 11/041 |
| | | | 248/316.1 |
| 2015/0340892 A1 | 11/2015 | Park et al. | |
| 2016/0149427 A1* | 5/2016 | Dittrich | G06F 1/1632 |
| | | | 320/115 |
| 2016/0156207 A1 | 6/2016 | Frankenberger | |
| 2016/0203455 A1 | 7/2016 | Hicks et al. | |
| 2021/0247807 A1* | 8/2021 | Ney | A47B 83/001 |
| 2023/0200551 A1* | 6/2023 | Morita | F16B 2/10 |
| | | | 335/285 |

OTHER PUBLICATIONS

International Searching Authority, Written Opinion of the International Searching Authority, PCT/US2019/035887, dated Sep. 17, 2019.

\* cited by examiner

STATIC STRUCTURE HAVING A PLURALITY OF DETACHABLE COMPONENTS

PRIORITY AND INCORPORATION BY REFERENCE

This PCT application is related to, and claims the priority benefit of, U.S. Provisional Patent Application Ser. No. 62/681,586, filed Jun. 6, 2018, the contents of which are incorporated herein directly and by reference in their entirety.

BACKGROUND

Retail operations processes often change, especially when a variable, such as online order fulfillment, become a greater percentage of the business revenue. The use of additional equipment, such as mobilized computers, workstations or desks are often undesirable because they are either not available or because they take up too much additional space. In retail operations, space is at a premium with focus on the profit per square foot. If additional bulky equipment, such as desks, cash wraps or standard computer carts, are permanently added to a retail operation, there is less square footage for product to be displayed and sold and therefore, revenue/profit may be compromised.

The invention described herein solves this problem by integrating a mobile desk, workstation or other detachable mobile devices into a static structure within a store or facility. The mobile components can then be individually deployed and configured to complete tasks and then docked back to the first static structure for storage, battery, capacitor and/or energy storage device (Battery) recharging, etc., once the tasks are complete. Thus, static structures having a single or plurality of detachable battery powered mobile components would be well received in the marketplace.

BRIEF SUMMARY

In a first embodiment, a base station for receiving, storing and charging a plurality of mobile detachable components comprises: a desk-like structure; an electronic device having a processor and configured for electrically coupling to a power source for charging; and a plurality of docking stations disposed within the desk-like structure of the base station and sized to receive a plurality of detachable mobile components therein, wherein the detachable mobile components are wheeled desk-like structures, each having their own electronic device and each being independently operable from one another and from the base station; wherein the plurality of docking stations within the base station are configured to receive, store, and charge the plurality of wheeled mobile detachable components.

In another embodiment, a system for receiving, storing, and charging, a plurality of detachable components, comprises: a base station having a desk-like structure, comprising: an electronic device having a processor and a mechanical coupling configured for electrically coupling to a power source for charging; and a plurality of docking stations disposed within the desk-like structure of the base station and sized to receive and charge a plurality of mobile detachable mobile components therein; and a plurality of mobile detachable components, each mobile detachable component comprising: a wheeled housing having a desk-like structure; a rechargeable battery; a docking port sized for coupling to one of the plurality of docking stations, wherein the rechargeable battery is charged when coupled to one of the plurality of docking stations in the base station; and an electronic device having a processor, wherein the electronic device is independently operable from the electronic device of the base station.

In yet another embodiment, a method for receiving, storing, and charging a plurality of mobile detachable components within a base station, comprises: receiving a mobile detachable component within a docking station of the base station, wherein the mobile detachable component is a wheeled desk-like structure, and wherein the base station is a desk-like structure; storing the mobile detachable component within the docking station of the base station until needed; and charging a rechargeable battery of an electronic device of the mobile detachable component when docked within the docking station of the base station, via a docking port on the mobile detachable component.

The present disclosure includes disclosure of a base station for receiving, storing, and charging a plurality of mobile detachable components, the base station comprising a desk-like structure, an electronic device having a processor and configured for electrically coupling to a power source for charging, and a plurality of docking stations disposed within the desk-like structure of the base station and sized to receive a plurality of detachable mobile components therein, wherein the detachable mobile components are wheeled desk-like structures, each having their own electronic device and each being independently operable from one another and from the base station, and wherein the plurality of docking stations within the base station are configured to receive, store, and charge the plurality of wheeled mobile detachable components.

The present disclosure includes disclosure of a base station, wherein the electronic device of the base station comprises a laptop, tablet, computer, or phone.

The present disclosure includes disclosure of a base station, wherein the electronic device of the base station is configured to be internet or network capable via a direct wired connection or via a wireless connection.

The present disclosure includes disclosure of a base station, wherein the electronic devices of the plurality of detachable components are configured to maintain wireless communications with the electronic device of the base station even when the plurality of detachable components are deployed away from the base station.

The present disclosure includes disclosure of a base station, wherein the electronic devices of the plurality of detachable components are configured to receive electrical charge when disposed within the plurality of docking stations.

The present disclosure includes disclosure of a base station, further configured to deploy one, two, or several of the plurality of detachable components for independent operation away from the base station.

The present disclosure includes disclosure of a base station, wherein the plurality of detachable components are configured for point of sale operations, inventory management, product demonstration, order fulfillment, or medical treatment operations.

The present disclosure includes disclosure of a base station, further comprising a remote database in wireless communication with the electronic device of the base station and in wireless communication with the electronic devices of the plurality of detachable components, wherein information can be continuously exchanged between the remote database, the base station, and the plurality of detachable components, even when the plurality of detachable components are deployed away from the base station.

The present disclosure includes disclosure of a base station, wherein the desk-like structure of the base station comprises a mobile desk, cash wrap, end cap, cart, rack, kiosk, docking station, shelving, or other piece of furniture.

The present disclosure includes disclosure of a system for receiving, storing, and charging a plurality of detachable components, comprising a base station having a desk-like structure, comprising an electronic device having a processor and a mechanical coupling configured for electrically coupling to a power source for charging, and a plurality of docking stations disposed within the desk-like structure of the base station and sized to receive and charge a plurality of mobile detachable mobile components therein, and a plurality of mobile detachable components, each mobile detachable component comprising a plurality of mobile detachable components, each mobile detachable component comprising, a wheeled housing having a desk-like structure, a rechargeable battery, a docking port sized for coupling to one of the plurality of docking stations, wherein the rechargeable battery is charged when coupled to one of the plurality of docking stations in the base station, and an electronic device having a processor, wherein the electronic device is independently operable from the electronic device of the base station.

The present disclosure includes disclosure of a system, wherein each of the electronic devices of the plurality of mobile detachable components are configured to maintain wireless communications with the electronic device of the base station, even when the plurality of mobile detachable components are deployed away from the base station.

The present disclosure includes disclosure of a system, wherein each electronic device of each mobile detachable component is independently operable.

The present disclosure includes disclosure of a system, wherein each of the electronic devices of each mobile detachable component comprises a laptop, tablet, computer, or phone.

The present disclosure includes disclosure of a system, further configured to deploy one, two, or several of the plurality of mobile detachable components for independent operation away from the base station.

The present disclosure includes disclosure of a system, wherein the plurality of mobile detachable components are configured for point of sale operations, inventory management, product demonstration, order fulfillment, or medical treatment operations.

The present disclosure includes disclosure of a system, further comprising a remote database in wireless communication with the electronic device of the base station and in wireless communication with the electronic devices of the plurality of mobile detachable components, wherein information can be continuously exchanged between the remote database, the base station, and the plurality of mobile detachable components, even when the plurality of mobile detachable components are deployed away from the base station.

The present disclosure includes disclosure of a system, wherein the desk-like structure of the base station comprises a mobile desk, cash wrap, end cap, cart, rack, kiosk, docking station, shelving, or other piece of furniture.

The present disclosure includes disclosure of a method for receiving, storing, and charging a plurality of mobile detachable components within a base station, the method comprising receiving a mobile detachable component within a docking station of the base station, wherein the mobile detachable component is a wheeled desk-like structure, and wherein the base station is a desk-like structure, storing the mobile detachable component within the docking station of the base station until needed, and charging a rechargeable battery of an electronic device of the mobile detachable component when docked within the docking station of the base station, via a docking port on the mobile detachable component.

The present disclosure includes disclosure of a method, further comprising deploying the mobile detachable component away from the base station, while maintaining wireless communications between the electronic device of the base station and the electronic device of the mobile detachable component.

The present disclosure includes disclosure of a method, further comprising returning the mobile detachable component back to a docking station within the base station, for charging and storing until needed again.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
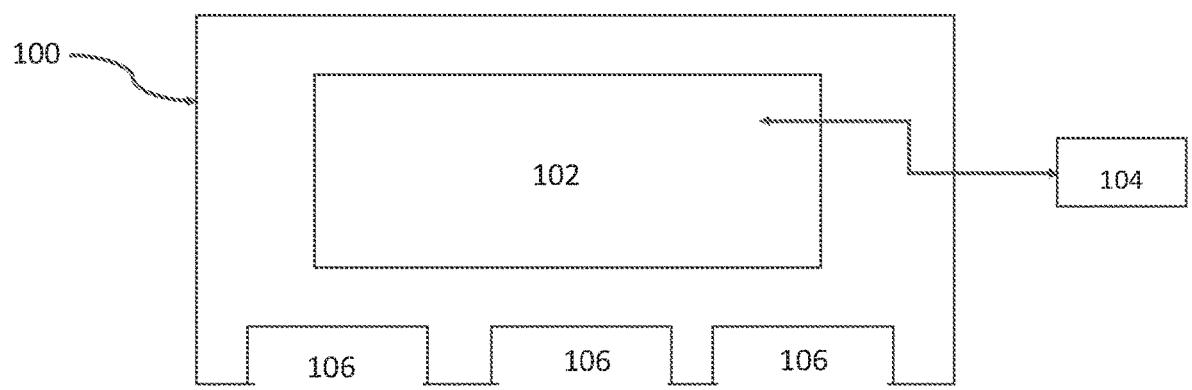
FIG. 1 shows a block diagram of a first static structure, according to an exemplary embodiment of the present disclosure.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various devices, systems, and methods for operating a static structure having a single or plurality of detachable battery powered mobile components. The detachable mobile components can be removed from the first static structure and mobilized individually to perform the same function or operation, or temporarily reconfigured to perform a different function or operation, in a separate location. These detachable, battery powered, mobile components can be utilized to improve point-of-sale efficiency in retail operations, food operations, hospital and/or medical settings, as well as various other operations and industries.

The first static base station structure 100 is shown and described in the block component diagram shown in FIG. 1. The plurality of detachable mobile components 200 are shown and described in the block component diagram shown in FIG. 2. FIG. 3 illustrates a block component diagram showing a system 300 comprising the first static base station structure 100 and a plurality of detachable mobile components 200 docked therein.

As shown in FIG. 1, the first static base station structure 100 may comprise a structure such as a desk, cash-wrap, kiosk, docking station, endcap, rack, shelving or other static piece of furniture. This first static base station structure 100 may operate the same as 200 and/or as a base station, for receiving, storing, and charging a plurality of detachable mobile components 200 (described below with regard to FIG. 2) therein or thereon.

The first static base station structure 100 may also include an electronic device 102, as shown in FIG. 1. The electronic device 102 may be a computer or other digital device having a processor, such as a laptop, tablet, phone etc. and may also comprise a monitor or display, printer, keyboard, scanner, mouse, etc. for operation within the workflow process. The electronic device 102 may further be internet or network capable, such as via a direct wired connection or via a wireless connection. As shown in FIG. 1, the electronic device 102 of the first static base station structure 100 may also be coupled to a power source 104 such as, for example, using a mechanical connector in at least one embodiment. Additionally, the first static base station structure 100 includes a plurality of docking stations 106 sized to receive the plurality of detachable mobile components 200 (described below with regard to FIG. 2) therein. The plurality of docking stations 106 are in communication with the electronic device 102 and the power source 104, such that the plurality of detachable mobile components 200 may be charged when placed within docking stations 106.

Figure 2:
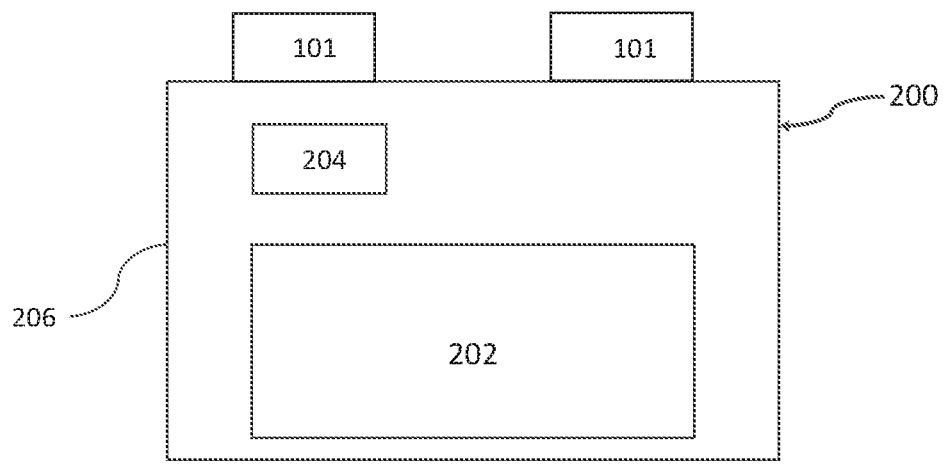
FIG. 2 shows a block diagram of a single detachable mobile component, according to an exemplary embodiment of the present disclosure
Figure 3:
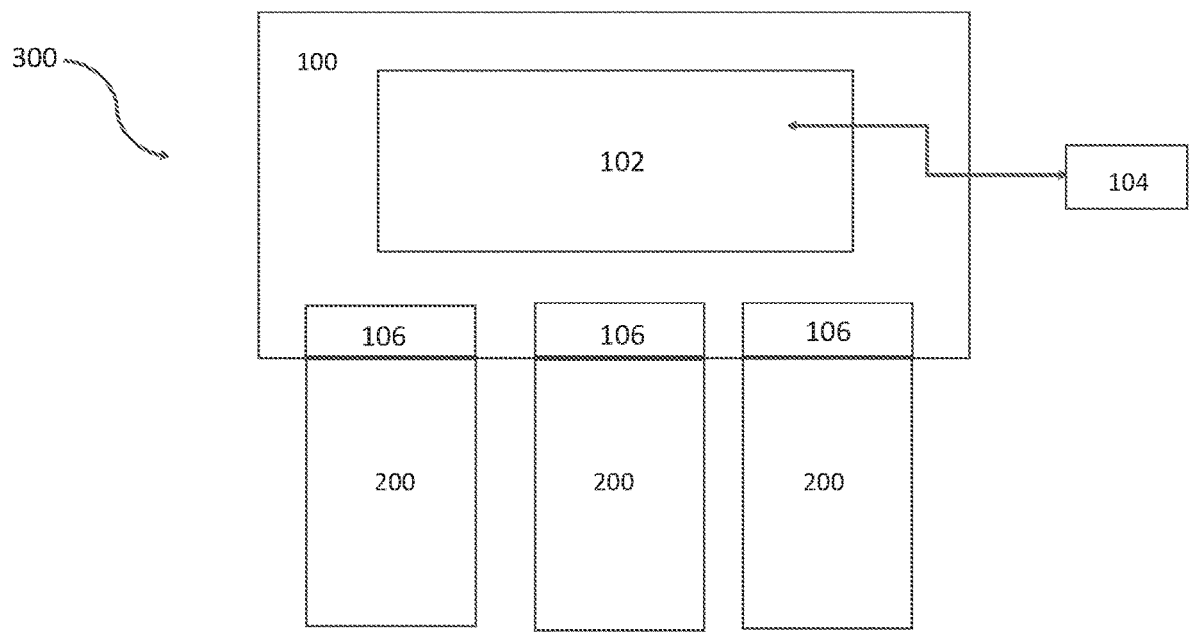
FIG. 3 shows a block diagram of a system having a first static structure having a plurality of detachable mobile components docked or coupled thereto, according to an exemplary embodiment of the present disclosure.

The present disclosure further includes a plurality of detachable mobile components 200, as shown in FIG. 2. Each of the plurality of detachable mobile components 200 is removable from and independently operable of the first static base station structure 100. A user may deploy only one, or a plurality of, the detachable mobile components 200 to complete a task such as, but not limited to, point of sale, inventory management, product demonstration and/or order fulfillment within a retail environment. Other tasks may include, but are not limited to, patient triage or scaling operations within a hospital. The plurality of the detachable mobile components 200 may be used in different physical locations than that of the first static base station structure 100. When the plurality of detachable mobile components 200 are deployed in different physical locations, they may maintain wired or wireless communications with each other and/or with the first static structure base station 100 and/or a remote database, ERP or business operations software. Wireless communications may be maintained via WiFi and/or Bluetooth.

As shown in FIG. 1, there may be three detachable mobile components 200 sized for docking within docking stations 106 of static base station structure 100. However, in alternative embodiments, there may be fewer than three, or more than three, detachable mobile components 200 utilized therein or thereon. Additionally, FIG. 2 illustrates a single detachable component 200, however it should be understood that multiple detachable components 200 could each comprise the same components as those illustrated in FIG. 2. As shown in FIG. 2, each of the plurality of detachable mobile components 200 is constructed of a housing or portable structure 206, such as a mobile workstation or desk or a portable laptop, for example Each of the plurality of detachable mobile components 200 may also comprise wheels or casters 101 (hidden or apparent) so that they may easily be mobilized or removed from first static structure 100 to a separate location.

Each of the plurality of detachable mobile components 200 may also comprise an electronic device 202 and an optional rechargeable battery 204 that can be connected mechanically or wirelessly to the first static structure 100. The rechargeable battery 204 may be in communication with a port on the detachable mobile component 200, such that the rechargeable battery 204 can be charged each time the detachable mobile component 200 is docked at one of the docking stations 106 on first static structure 100. The rechargeable battery 204 can be utilized to power the electronic device 202 of the detachable mobile component 200 when removed from the static base station structure 100, and then returned to the first static structure 100 for rechargeable battery 204 recharge and storage. When the detachable mobile component 200 is docked at docking station 106 on first static structure 100, it is being recharged so that is it can be used remotely at a later time. Rechargeable battery 204 can be permanent or removable, and if removable, it could be replaced (such as being hot-swapped) with another rechargeable battery 204, to maintain power of said detachable mobile component.

As shown in FIG. 2, each of the plurality of detachable mobile components 200 may also comprise an electronic device 202. The electronic device 202 may be the same as or similar to the electronic device 102 of the first static base station structure 100 and may comprise a computer, laptop, tablet, or other device used to perform a task remotely. The electronic device 202 may be a computer or other digital device having a processor, such as a laptop, tablet, phone etc. and may also comprise a monitor or display, printer, keyboard, scanner, mouse, etc. for operation within the workflow process. The electronic device 202 may further be internet capable, such as via a direct wired connection or via a wireless connection.

Figure 4:
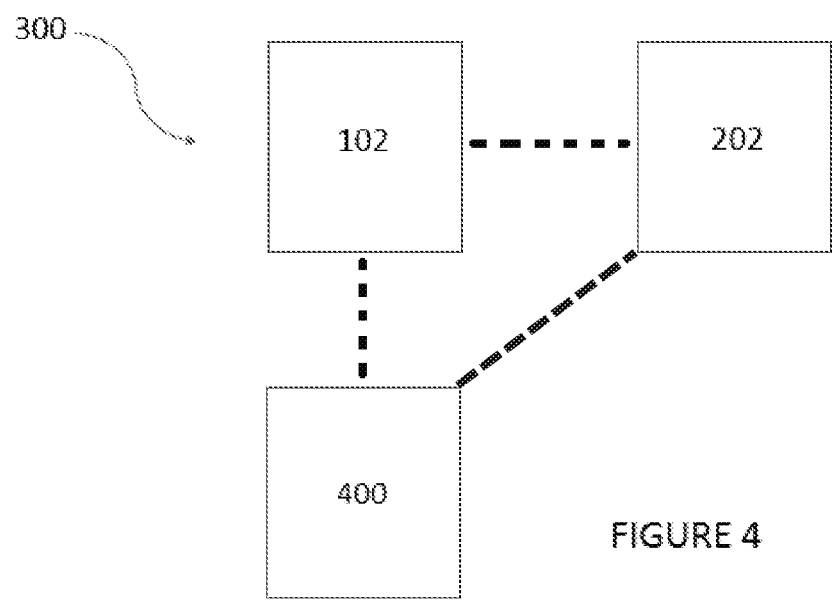
FIG. 4 shows a block diagram of components of a system in communication with one another, according to an exemplary embodiment of the present disclosure.

With reference now to FIG. 4, the electronic device 202 of each of the detachable mobile components 200 may be in wired or wireless communication (as indicated by the dashed lines) with the electronic device 102 of the first static base station structure 100, and/or may be in wired or wireless communication (as indicated by the dashed lines) with another electronic device, such as a remote database or other electronic device (referred to herein as remote device 400). In this way, such that information can be continuously exchanged with the plurality of detachable mobile components 200 even when they are deployed away from the first static base station structure 100 or remote device 400. This information/data exchange/communication is depicted in FIG. 4, whereby electronic device 102 can communicate (as indicated by the dashed lines), in at least one embodiment, with electronic device 202 and/or remote device 400, forming at least part of an exemplary system 300. In an alternative embodiment, the electronic device 202 of the plurality of detachable components 200 may exchange information with the electronic device 102 of first static base station structure 100 when docked at docking stations 106. When the plurality of detachable components 200 are docked at docking stations 106 (i.e., combined with first static structure 100) at first static structure 100, wired or wireless communication may then be combined or continue to operate exclusively of one another.

FIG. 3 illustrates a system 300 including a first static base station structure 100 having a plurality of detachable mobile components 200 docked thereon at docking stations 106. First static structure 100 is coupled to power source 104, which powers the first static structure 100 and charges the rechargeable batteries 204 of the detachable mobile components 200. In operation, a user may remove one, or a plurality of, the detachable mobile components 200, such as to place said detachable mobile components 200 at different locations. The user, or multiple users, may operate each of the plurality of detachable mobile components 200 independently from each other and/or from the static structure 100. When the user has completed his/her tasks, he/she may return the plurality of detachable mobile components 200 to the docking stations 106 on the first static structure 100 for charging and storage. Alternatively, a user may choose to deploy only the detachable mobile components 200 and keep the first static structure 100 at a base or storage location separate from valuable retail floor space.

Some exemplary retail operations for a static base station structure 100 having a plurality of detachable mobile components 200 will now be described herein. In one example, a retailer may utilize systems of the present disclosure with one static structure 100 and three detachable mobile components 200, for a total of 4 separate individual computerized components that can operate together or separately. When the three detachable mobile components 200 are combined or docked on the static structure 100, the amount of retail floor space required would be minimized Throughout the day, the processes and tasks required by a retailer may change. In another example, a retail sales associate may receive many e-commerce orders that need to be fulfilled. With systems of the present disclosure, the retail sales associate can disconnect and remove one of the detachable mobile component 200 desks and, if required, configure it with the electronic devices, boxes, labels, and other material required to fulfill an online order. In this case, the detachable mobile component 200 desk operates on rechargeable battery 204 power so that the retail sales associate can work autonomously of the static structure 100, resulting in improved efficiency (i.e., less congestion at the point-of-sale).

In another exemplary retail operation, a retail sales associate may remove the detachable mobile component 200 to operate point-of-sale at a special sales event or remote location, such as at sidewalk or parking lot sales or to perform inventory management or mark-downs. In another example, a food concession operator may deploy the detachable mobile component 200 to a remote location (such as via a food truck) for point-of-sale. In yet another example, a hospital emergency room may experience a sudden increase in patient volume. To support triage, additional medical staff may remove one or more of the detachable mobile components 200 so that more patients can be treated quickly. Once the increased demand has been addressed, the detachable mobile components 200 can be returned to, and reconnected with, the first static structure 100. In yet another embodiment, some facilities may choose to utilize more than one static structure 100, such that there are many detachable mobile components 200 available, to treat a huge volume of customers or patients when needed.

Furthermore, the present disclosure includes disclosure of retrofitting existing static structures 100, such as within a store, hospital, or other environment, to accommodate a detachable mobile component 200 of the present disclosure. In such embodiments, for example, static structures 100 would be configured, such as to receive one or more of an electronic device 102, a power source 104, and one or more docking stations 106, such as a plurality of docking stations 106, whereby each docking station 106 is configured to receive at least one detachable mobile component 200 so that the at least one detachable mobile component 200 can be operated while docked to static structure 100, as referenced herein.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A base station for receiving, storing, charging and a plurality of mobile detachable components, the base station comprising:
   a furniture structure;
   an electronic device having a processor and configured for electrically coupling to a power source for charging;
   a plurality of docking stations disposed within the furniture structure of the base station and sized to receive a plurality of detachable mobile components therein, wherein the detachable components are wheeled furniture structures, each having their own electronic device and each being independently operable from one another and from the base station; and
   wherein the plurality of docking stations within the base station are configured to receive, store, and charge the plurality of wheeled mobile detachable components;
   a remote database in wireless communication with the electronic device of the base station and in wireless communication with the electronic devices of the plurality of detachable components, wherein information can be continuously exchanged between the remote database, the base station, and the plurality of detachable components, even when the plurality of detachable components are deployed away from the base station, and wherein when the plurality of detachable mobile components are deployed in different physical locations, they may maintain communications with each other.

2. The base station of claim 1, wherein the electronic device of the base station comprises a laptop, tablet, computer, or phone.

3. The base station of claim 1, wherein the electronic device of the base station is configured to be internet or network capable via a direct wired connection or via a wireless connection.

4. The base station of claim 1, wherein the electronic devices of the plurality of detachable components are configured to maintain wireless communications with the electronic device of the base station even when the plurality of detachable components are deployed away from the base station.

5. The base station of claim 1, wherein the electronic devices of the plurality of detachable components are configured to receive electrical charge when disposed within the plurality of docking stations.

6. The base station of claim 1, further configured to deploy one, two, or several of the plurality of detachable components for independent operation away from the base station.

7. The base station of claim 1, wherein the plurality of detachable components are configured for point of sale operations, inventory management, product demonstration, order fulfillment, or medical treatment operations.

8. The base station of claim 1, wherein the furniture structure of the base station comprises a mobile desk, cash wrap, end cap, cart, rack, kiosk, docking station, shelving, or other structure.

9. The base station of claim 1, wherein the plurality of detachable mobile components have a first configuration and a second configuration, wherein the plurality of mobile components perform a first function or operation in the first configuration and a second function or operation in a second configuration and wherein the plurality of mobile detachable components can be mobilized individually to perform different functions or operations in separate locations.

10. The base station of claim 1, wherein when the plurality of detachable mobile components are docked at the plurality of docking stations, the plurality of detachable mobile components exchange information with the base station via both wired and wireless communications.

11. A system for receiving, storing, and charging, a plurality of detachable components, comprising:
a base station having a furniture structure, comprising:
an electronic device having a processor and a mechanical coupling configured for electrically coupling to a power source for charging; and
a plurality of docking stations disposed within the furniture structure of the base station and sized to receive and charge a plurality of mobile detachable components therein; and
a plurality of mobile detachable components, each mobile detachable component comprising:
a wheeled housing having a furniture structure;
a rechargeable battery;
a docking port sized for coupling to one of the plurality of docking stations, wherein the rechargeable battery is charged when coupled to one of the plurality of docking stations in the base station; and
an electronic device having a processor, wherein the electronic device is independently operable from the electronic device of the base station; and
a remote database in wireless communication with the electronic device of the base station and in wireless communication with the electronic devices of the plurality of mobile detachable components, wherein information can be continuously exchanged between the remote database, the base station, and the plurality of mobile detachable components, even when the plurality of mobile detachable components are deployed away from the base station, and wherein when the plurality of mobile detachable components are deployed in different physical locations, they may maintain communications with each other.

12. The system of claim 11, wherein each of the electronic devices of the plurality of mobile detachable components are configured to maintain wireless communications with the electronic device of the base station, even when the plurality of mobile detachable components are deployed away from the base station.

13. The system of claim 11, wherein each electronic device of each mobile detachable component is independently operable.

14. The system of claim 11, wherein each of the electronic devices of each mobile detachable component comprises a laptop, tablet, computer, or phone.

15. The system of claim 11, further configured to deploy one, two, or several of the plurality of mobile detachable components for independent operation away from the base station.

16. The system of claim 11, wherein the plurality of mobile detachable components are configured for point of sale operations, inventory management, product demonstration, order fulfillment, or medical treatment operations.

17. The system of claim 11, wherein the furniture structure of the base station comprises a mobile desk, cash wrap, end cap, cart, rack, kiosk, docking station, shelving, or other piece of furniture or structure.

18. A method for receiving, storing, and charging a plurality of mobile detachable components within a base station, the method comprising:
receiving a mobile detachable component within a docking station of the base station, wherein the mobile detachable component is a wheeled furniture structure, and wherein the base station is a furniture structure;
storing the mobile detachable component within the docking station of the base station until needed;
charging a rechargeable battery of an electronic device of the mobile detachable component when docked within the docking station of the base station, via a docking port on the mobile detachable component; and
deploying the mobile detachable component away from the base station, while maintaining wireless communications between the electronic device of the base station and an electronic device of the mobile detachable component,
deploying a second mobile detachable component away from the base station, while maintaining communication between the second mobile detachable component and the mobile detachable component while the second mobile detachable component and the mobile detachable component are both deployed away from the base station.

19. The method of claim 18, further comprising returning the mobile detachable component back to a docking station within the base station, for charging and storing until needed again.

* * * * *